(12) United States Patent
Rabinovitch et al.

(10) Patent No.: US 7,232,584 B2
(45) Date of Patent: Jun. 19, 2007

(54) METHOD OF CHOCOLATE COATING SOFT CONFECTIONERY CENTERS

(75) Inventors: Kevin Rabinovitch, Hackettstown, NJ (US); Shane Benedict, Hackettstown, NJ (US)

(73) Assignee: Mars, Incorporated, McLean, VA (US)

( * ) Notice: Subject to any disclaimer, the term of this patent is extended or adjusted under 35 U.S.C. 154(b) by 190 days.

(21) Appl. No.: 10/342,917

(22) Filed: Jan. 15, 2003

(65) Prior Publication Data
US 2003/0152678 A1    Aug. 14, 2003

Related U.S. Application Data

(60) Provisional application No. 60/349,143, filed on Jan. 15, 2002.

(51) Int. Cl.
*A23G 3/54*    (2006.01)
(52) U.S. Cl. .................... 426/306; 426/660
(58) Field of Classification Search ............ 426/103, 426/306, 302, 305, 660
See application file for complete search history.

(56) References Cited

U.S. PATENT DOCUMENTS

| | | | |
|---|---|---|---|
| 1,559,412 A | 10/1925 | Franzen | |
| 3,152,908 A | 10/1964 | Wiseman et al. | 99/23 |
| 3,574,639 A * | 4/1971 | Forkner | 426/99 |
| 4,059,378 A | 11/1977 | Sollich | 425/362 |
| H1322 H | 6/1994 | Moore et al. | 426/572 |
| 5,424,085 A | 6/1995 | Hsieh et al. | 426/289 |
| 6,228,172 B1 | 5/2001 | Taylor et al. | 118/712 |

FOREIGN PATENT DOCUMENTS

| | | |
|---|---|---|
| EP | 0 506 251 A1 | 9/1992 |
| FR | 2 350 792 A | 12/1977 |
| JP | 01030541 | 2/1989 |
| JP | 07328408 | 12/1995 |
| WO | WO 98/24541 | 6/1998 |

OTHER PUBLICATIONS

Minifie, Bernard. "Chocolate, Cocoa, and Confectionary: Science and Technology". 3rd Edition, Chapman and Hall, New York. 1989.*
Lees, R. "Sugar Confectionary and Chocolate Manufacture". Leonard Hill, Great Britain. 1973.*

* cited by examiner

*Primary Examiner*—Arthur L. Corbin
(74) *Attorney, Agent, or Firm*—Fitzpatrick, Cella, Harper & Scinto

(57) ABSTRACT

The present invention is directed to a method of coating soft confectionery centers with chocolate. The method comprises the steps of: mixing the soft confectionery centers having a bed temperature of from about 0° C. to about 15° C.; applying chocolate onto the soft confectionery centers, wherein the chocolate is at a temperature of from about 36° C. to about 50° C.; and cooling the chocolate covered soft confectionery centers.

12 Claims, No Drawings

METHOD OF CHOCOLATE COATING SOFT CONFECTIONERY CENTERS

CROSS REFERENCE TO RELATED APPLICATIONS

This application claims the benefit of U.S. Provisional Application No. 60/349,143, filed on Jan. 15, 2002.

BACKGROUND OF THE INVENTION

1. Field of the Invention

The present invention relates to a method of coating confectionery centers. More particularly, the present invention relates to a method of coating soft confectionery centers with chocolate by controlling the temperature of the chocolate and the soft confectionery centers.

2. Description of Related Art

Confectionery centers are commonly made from a variety of components such as chocolate, peanut butter, raisins, toffee, taffy, fudge and a range of nuts including but not limited to, peanuts and almonds. The centers are often treated further by applying a coating by a panning process. This involves a rotating pan that tumbles the confectionary centers so that they rotate, tumble, and cascade over one another. While this is happening, chocolate or a sugar syrup is applied manually or by one of various spraying methods. The chocolate or sugar syrup is solidified on the confectionery centers by introducing air that cools and/or dries the coating on the centers in the rotating pan.

Traditionally, chocolate panning operations are performed at product temperatures between 15° C. to 30° C. Those skilled in the art have found that within this temperature range, smooth chocolate coated confectionery centers can be made. The temperature profile of the coating operation follows a zig-zag shaped pattern. As liquid chocolate is applied, the bed temperature of the centers increases and then decreases back down to the starting temperature, as the product is cooled. For example, liquid chocolate may be applied to centers where the bed temperature is 20° C. As the warm liquid chocolate coats the centers, the bed temperature increases to 33° C. Cool air is applied to the centers, which lowers the bed temperature back down to 20° C. and the chocolate coating cycle is repeated until the desired amount of chocolate is applied.

The goal of the panning operation is to uniformly coat all the centers evenly and homogeneously to the same extent. If the centers are too warm, the chocolate will not solidify quickly enough to adhere properly to the centers. If the product is too cold, the coating tends to rapidly freeze, creating an uneven finish on the center pieces. The panning process must allow for the liquid to be applied, distributed, and dried and/or cooled. This cycle can be repeated numerous times until a desired appearance or piece size is obtained.

Confectionery centers that are soft or delicate cannot be handled in the same manner as confectionery centers made of chocolate. The soft centers are predisposed to quality problems arising from deformation of the soft centers. For example, the most common way of applying coatings, such as chocolate, to nougat centers is enrobing, but it is impossible to make a uniform sphere without a flat spot using a standard enrober. Additionally, if aerated nougat centers are enrobed at a center temperature below about 18° C., there is a tendency for the nougat to crack the chocolate when it warms and expands. Nougat typically has a density of less than 1 g/cm$^3$ and is coated, for example enrobed with chocolate, at temperatures below about 30° C. in order to maintain its shape. Thus, special processing methods must be used to produce a smooth, evenly coated piece without a flat spot.

BRIEF SUMMARY OF THE INVENTION

The present invention is directed to a method of coating soft confectionery centers with chocolate. The method comprises the steps of: mixing the soft confectionery centers having a bed temperature of from about 0° C. to about 15° C.; applying chocolate onto the soft confectionery centers, wherein the chocolate is at a temperature of from about 36° C. to about 50° C.; while simultaneously cooling the chocolate covered soft confectionery centers.

DETAILED DESCRIPTION OF THE INVENTION

The present invention provides a method for applying chocolate over confectionery centers that are soft and delicate at temperatures of 18° C. or higher. Soft centers are more prone to deformations and defects at these temperatures. However, using the method of the present invention, a smooth uniform coating of chocolate can be applied over the soft confectionery centers.

In the method of the present invention, soft confectionery centers having a bed temperature of about 0° C. to about 15° C. are subjected to mixing. Preferably, the bed temperature is about 4° C. to about 13° C. More preferably, about 6° C. to about 12° C. and even more preferably, about 7° C. to about 11° C. Most preferably, the bed temperature is about 8° C. to about 10° C. It should be understood that the soft confectionery centers may be placed into the pan or coating apparatus at a bed temperature that is warmer than desired, but still below the temperature at which they would deform. The soft confectionery centers are then cooled to the desired bed temperature prior to the mixing step or the application of chocolate. Next, chocolate is applied at a temperature of about 36° C. to about 50° C. onto the soft confectionery centers while they are being mixed and simultaneously cooled. Preferably, the temperature of the chocolate when applied is about 36° C. to about 46° C. More preferably, about 36° C. to about 42° C. The chocolate spreads over and coats the soft confectionery centers, raising the bed temperature. Cooling means, such as conditioned air, is applied to the chocolate coated centers to solidify the chocolate and control the bed temperature. In a preferred embodiment, the temperature of the bed is not lowered to its initial starting temperature, i.e. the bed temperature just prior to starting the chocolate coating operation. Rather, the thin layer of chocolate that surrounds the centers allows the bed temperature to be ramped up. In other words, as the layer of chocolate surrounding the centers increases, the stability of the soft centers increases, permitting warmer bed temperatures to be used during later stages of the coating process. For example, liquid chocolate may be applied to soft centers where the bed temperature is 10° C. As the warm liquid chocolate coats the centers, the bed temperature increases to 18° C. Cool air is applied to the centers, which lowers the bed temperature back down to 13° C. and liquid chocolate is applied a second time, raising the bed temperature to 22° C. This is followed by cooling, which lowers the bed temperature down to 18° C. The coating cycle is repeated in this manner, where the bed temperature ramps up as the chocolate layer increases.

In another embodiment, the liquid chocolate is applied in a continuous fashion over the soft centers where the initial bed temperature is 10° C. Conditioned air is also applied simultaneously to cool and dry the chocolate onto the surface of the soft confectionery centers. As the warm liquid chocolate coats the centers, the bed temperature slowly rises. Since the chocolate is applied continuously and cooled continuously, the bed temperature rises continuously as the chocolate layer builds on the soft center pieces.

The processing conditions that will be used are greatly dependent upon factors, such as the type of equipment that will be used, the physical properties of the soft centers, the pan charge, the amount of chocolate to be applied, desired cycle times, cleaning considerations, etc. However, the proper processing conditions can be readily determined by one skilled in the art.

In addition, the rotational speed of the coating apparatus will depend upon its configuration and dimensions (e.g., diameter, length, etc.). In a preferred embodiment, a cylindrical drum coater is used. The coating apparatus should be continuously rotated so that the soft confectionery centers are tumbling and mixing over one another. For example, in a panning operation, it is desirable to have a "tulip" pan (e.g., 1 meter in diameter) rotating at from about 15 rpm to about 25 rpm. Furthermore, the pan may be positioned at a predetermined angle to facilitate the mixing action. Alternatively, in a cylindrical drum coater, baffles or speed bumps may be used to facilitate mixing.

The chocolate is applied either manually or automatically by dripping or spraying. Spraying is the preferred method and is best performed where the spray is dispersed in a homogeneous and uniform pattern across the face of the bed, minimizing the need for radial and axial mixing and redistribution of chocolate before solidification.

As the chocolate is spreading over the soft confectionery centers, cooling means are applied to solidify the chocolate onto the surfaces. Cooling can be performed by many different methods, such as, for example, applying air onto the chocolate covered soft confectionery centers. The air is ideally at a temperature of from about 5° C. to about 15° C., with a relative humidity of from about 20% to about 80%. High volumes of air are preferably used to accelerate the rate of cooling. A volume ratio of from about 4:1 to about 20:1 of cubic feet per minute (cfm) of air to kilograms of soft confectionery produces suitable results. However, actual processing parameters and conditions can readily be determined by one skilled in the art, taking into consideration factors such as equipment to be used, product characteristics, amount of chocolate to be applied, etc.

The term "chocolate" is intended to refer to all chocolate or chocolate-like compositions with a fat phase or fat-like composition. The term is intended, for example, to include standardized and non-standardized chocolates, i.e., including chocolates with compositions conforming to the U.S. Standards Of Identity (SOI) and compositions not conforming to the U.S. Standards Of Identity, respectively, including dark chocolate, baking chocolate, milk chocolate, sweet chocolate, semi-sweet chocolate, buttermilk chocolate, skim-milk chocolate, mixed dairy product chocolate, low fat chocolate, white chocolate, aerated chocolates, compound coatings, non-standardized chocolates and chocolate-like compositions, unless specifically identified otherwise. In a preferred embodiment, the chocolate is SOI chocolate.

Nonstandardized chocolates result when, for example, the nutritive carbohydrate sweetener is replaced partially or completely; or when the cocoa butter or milkfat are replaced partially or completely; or when components that have flavors that imitate milk, butter or chocolate are added or other additions or deletions in formula are made outside the FDA standards of identify of chocolate or combinations thereof.

For use with the method disclosed herein, the only requirement of the chocolate is that it be liquid as applied. Keeping the chocolate at a temperature of about 36° C. to about 50° C. will ensure that it is in a liquid state. Preferably, the temperature is about 36° C. to about 42° C.

The amount of chocolate that will be applied to the soft confectionery centers is dependent upon the product design. Typically, the chocolate is about 10 wt. % to about 70 wt. % of the total weight of the chocolate covered soft confectionery center piece. Preferably, the chocolate is about 20 wt. % to about 40 wt. % of the total weight of the chocolate covered soft confectionery center piece. In a preferred embodiment, the weight ratio of chocolate to soft confectionery center is about 40:60. Of course the weight ratio range may vary with the density of the center.

The chocolate covers and builds a layer around the soft confectionery centers. The thickness of the chocolate layer will depend upon the product design and/or other desired attributes, e.g., texture. The preferred thickness of the chocolate layer is from about 0.5 mm to about 4 mm. More preferably, the chocolate layer is about 0.75 mm to about 3 mm thick and most preferably, about 1 mm to about 2 mm thick. In a preferred embodiment, the product is designed so that the chocolate layer surrounding the soft confectionery center is about 1.5 mm thick.

Any suitable means may be used to apply the chocolate onto the soft confectionery centers. For example, the chocolate can be applied manually by hand, drizzling, dripping, or by using a spraying technique. Preferably the chocolate is applied by spraying. To ensure rapid even coating, the chocolate should be applied by spraying the confectionery centers where the centers are moving most rapidly in the pan. For the purposes of the invention, the term "spray" or "spraying" is understood to mean that the application density of the material that is applied, e.g., $g/cm^2s$ of chocolate, is less than about 200 $g/cm^2s$.

The confectionery centers that are suitable for use with the present invention are described as soft confectionery centers. Absent a protective coating, such as chocolate, collection of these soft centers tend to deform and/or lose their shape at temperatures greater than about 18° C., in a coating process. Deformation or loss of shape is defined as a change in any of the dimensions of the center by more than 10% (not including any changes due to addition of a coating). For example, a 15 mm diameter sphere that has been flattened into an ellipsoid with a length of 17 mm and a perpendicular diameter at its widest point of 14 mm would be defined as deformed, as the change in length is 13% ([17 mm−15 mm]/15 mm=13.3%). By practicing the invention, the amount (by weight) of deformed centers in the final product will decrease. The amount of deformed centers will be less than about 90%, preferably less than about 75%, and more preferably less than about 50%. Still more preferably, the deformed centers will be less than about 35%, and most preferably less than about 10%. This is particularly noticeable under processing conditions, as the soft centers are handled in a rough or harsh manner. For example, during most panning operations the soft centers are subjected to tumbling action at a temperature greater than 18° C., which leads to misshaped and deformed pieces. The soft confectionery centers are made from confectionery components such as, for example, caramel, nougat, base-creme, fudge, noisette, fondant creme, turkish delight, truffle, marshmallow, frappe, and the like.

In a preferred embodiment the confectionery center is made of caramel, nougat or a combination of the two.

Caramel is typically prepared from a mixture of sugar, milk, fat, and optional flavorings such as vanillin. The mixture is cooked, resulting in a product that has a soft, smooth chewy texture, with a distinctive flavor. Suitable methods of cooking the caramel mixture include, but are not limited to, a scrape surface heat exchanger, an evaporator, kettle, or any other suitable means that is capable of browning and driving off moisture from the caramel mixture.

Nougat is formulated by mixing a cooked sugar based syrup and a whipping agent. The cooked sugar based syrup is often made using a combination of sucrose and corn syrup. The whipping agent may be protein based, e.g., milk, egg, or soy protein. The cooked sugar based syrup is combined with the whipping agent, as the mixture is aerated and mixed to make a frappe. Nougat is formed by adding to that frappe a flavoring/coloring slurry which can be a fat or aqueous suspension, solution or dispersion.

By aerating the mixture, a gas such as air or nitrogen, is suspended, yielding a product that has a soft fluffy texture and reduced density characteristic of nougat. The degree of aeration will depend upon the texture desired.

Suitable methods of aeration include, but are not limited to, mechanical aeration using a planetary beater at atmospheric pressure or injection of pressurized air into a continuous pressure whisk or pin beater.

Chocolate coating operations using the method of the present invention have been shown to produce smoother center pieces with less rejects. Moreover, by having the bed temperature of the soft confectionery centers at about 5° C. to about 15° C., it has been found that panning operations can be completed in shorter periods of time. Another benefit of controlling the temperature of the centers is that a more reasonable bed depth may be used in coating operations.

EXAMPLE

Spherical caramel centers with a diameter of 13 mm are made using a formulation, which rapidly deforms in shape at temperatures above 15° C. The caramel formulation cannot be altered because it provides a texture that is desirable from a consumer point of view, because it is soft and creamy. The product design also requires that the caramel center be coated with a minimal amount of chocolate to provide mechanical support. For this particular caramel formulation and the subsequent intended packaging, it has been found that a chocolate coating of 45% (percentage of total finished piece weight) is required, equating to a 1.43 mm thick uniform chocolate coating.

90 kilograms of spherical caramel centers are charged into a cylindrical drum that has a diameter of 1 m and a length of 2 m. The initial bed temperature of the caramel centers is 10° C. The drum is set to rotate at 15 RPM. Based on the pan charge and chocolate coating percentage, a total of 73.5 kg of chocolate are required (73.5 kg chocolate/[73.5 kg chocolate+90 kg centers]=45% chocolate). Liquid chocolate at 40° C. is applied continuously with a uniform spray of small droplets through 6 nozzles to minimize mixing and redistribution of the chocolate prior to solidification of that chocolate on the surface of the pieces. As the chocolate is applied, 1200–1800 cubic feet per minute (CFM) of cooling air at 10° C. is supplied to the drum. The chocolate spray rate and cooling air supply are adjusted such that the bed temperature rises continuously over the course of the coating cycle reaching 24° C. at the point that the desired amount of chocolate has been applied. The chocolate spray is stopped while the cooling air continues to blow to reduce the temperature of the product bed prior to discharge from the pan. Coating in this example by means of the invention described above allows the production of a bed of finished candy with less than 5% of the individual pieces exceeding the limit for deformation discussed above.

Coating the example caramel in a more traditional manner, such as starting with a bed temperature of 20° C. and alternating 60 second shots (applications) of chocolate at 45° C. (with or without air) with 30 seconds cooling air at 15° C., would result in a significant majority (likely>80%) of the individual pieces exceeding the deformation threshold.

While the invention has been described above with reference to specific embodiments thereof, it is apparent that many changes, modifications, and variations can be made without departing from the inventive concept disclosed herein. Accordingly, it is intended to embrace all such changes, modifications, and variations that fall within the spirit and broad scope of the appended claims. All patent applications, patents, and other publications cited herein are incorporated by reference in their entirety.

The invention claimed is:

1. A method of chocolate coating soft confectionery centers, comprising the steps of:
   (a) tumbling said soft confectionery centers having an initial bed temperature of from about 0° C. to about 15° C., wherein said soft confectionery centers deform or lose shape when subjected to tumbling at a bed temperature greater than 18° C.;
   (b) applying said chocolate directly onto the surface of said tumbling soft confectionery centers, to cover the centers with chocolate wherein said chocolate is at a temperature of from about 36° C. to about 50° C.; and
   (c) cooling said chocolate covered soft confectionery centers.

2. The method of claim 1, wherein said soft confectionery centers are tumbled at an initial bed temperature from about 7° C. to about 12° C.

3. The method of claim 1, wherein the temperature of said chocolate applied onto said tumbling soft confectionery centers is from about 36° C. to about 42° C.

4. The method of claim 1, wherein steps (b) and (c) are performed simultaneously.

5. The method of claim 4, wherein the temperature of said bed increases after applying chocolate onto said soft confectionery centers.

6. The method of claim 1, wherein said soft confectionery centers are selected from the group consisting of caramel, nougat, base-creme, fudge, noisette, fondant creme, turkish delight, truffle, marshmallow, frappe, and mixtures thereof.

7. The method of claim 1, wherein said chocolate is applied by spraying.

8. The method of claim 1, wherein said chocolate covered soft confectionery centers are cooled by applying air onto said chocolate covered soft confectionery centers.

9. The method of claim 8, wherein said air is at a temperature of from about 5° C. to about 15° C. and from about 20% to about 80% relative humidity.

10. The method of claim 8, wherein said air is applied at a volume ratio of from about 4:1 to about 20:1 cfm of said air to kilograms of said soft confectionery centers.

11. The method of claim 1, wherein said step of tumbling is performed in a rotating pan.

12. The method of claim 1, further comprising the step of cooling said soft confectionery centers to said initial bed temperature of from about 0° C. to about 15° C. prior to said tumbling step.

* * * * *

UNITED STATES PATENT AND TRADEMARK OFFICE
CERTIFICATE OF CORRECTION

PATENT NO.       : 7,232,584 B2                          Page 1 of 1
APPLICATION NO.  : 10/342917
DATED            : June 19, 2007
INVENTOR(S)      : Kevin Rabinovitch et al.

It is certified that error appears in the above-identified patent and that said Letters Patent is hereby corrected as shown below:

ON TITLE PAGE AT ITEM (56) OTHER PUBLICATIONS

In "Minifie, Bernard. "Chocolate,... Technology"": "Confectionary:" should read --Confectionery:--; and
In "Lees, R. "Sugar Confectionary and . . . Manufacture": "Confectionary" should read --Confectionery--.

COLUMN 6

Line 47, "of" should read --of:--.

Signed and Sealed this

Eleventh Day of December, 2007

JON W. DUDAS
*Director of the United States Patent and Trademark Office*

UNITED STATES PATENT AND TRADEMARK OFFICE
CERTIFICATE OF CORRECTION

PATENT NO. : 7,232,584 B2
APPLICATION NO. : 10/342917
DATED : June 19, 2007
INVENTOR(S) : Kevin Rabinovitch et al.

It is certified that error appears in the above-identified patent and that said Letters Patent is hereby corrected as shown below:

ON TITLE PAGE AT ITEM (56) OTHER PUBLICATIONS

In "Minifie, Bernard. "Chocolate, . . . Technology"": "Confectionary:" should read --Confectionery:--; and
In "Lees, R. "Sugar Confectionary and . . . Manufacture"": "Confectionary" should read --Confectionery--.

COLUMN 6

Line 47, "of" should read --of:--.

Signed and Sealed this

Eighth Day of January, 2008

JON W. DUDAS
*Director of the United States Patent and Trademark Office*